United States Patent
Bellingham (10) Patent No.: US 11,184,358 B2
(45) Date of Patent: *Nov. 23, 2021

(54) CONTENT RIGHTS HEADERS

(71) Applicant: Home Box Office, Inc., New York, NY (US)

(72) Inventor: Gregory John Bellingham, Seattle, WA (US)

(73) Assignee: HOME BOX OFFICE, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/806,019

(22) Filed: Mar. 2, 2020

(65) Prior Publication Data

US 2020/0204554 A1 Jun. 25, 2020

Related U.S. Application Data

(63) Continuation of application No. 15/194,969, filed on Jun. 28, 2016, now Pat. No. 10,616,227.

(Continued)

(51) Int. Cl.
*H04L 29/06* (2006.01)
*G06F 16/951* (2019.01)
(Continued)

(52) U.S. Cl.
CPC ............ *H04L 63/10* (2013.01); *G06F 16/951* (2019.01); *H04N 21/2541* (2013.01);
(Continued)

(58) Field of Classification Search
CPC .......................... H04L 63/10; H04N 21/2541; H04N 21/4627; H04N 21/26613; H04N 21/44204; G06F 16/951
See application file for complete search history.

(56) References Cited

U.S. PATENT DOCUMENTS

2003/0154479 A1 8/2003 Brenner et al.
2003/0163684 A1* 8/2003 Fransdonk .......... H04L 63/0823
713/153

(Continued)

FOREIGN PATENT DOCUMENTS

WO 0058859 A2 10/2000
WO 03055219 A2 7/2003

OTHER PUBLICATIONS

International Search Report & Written Opinion for PCT Application Serial No. PCT/US2016/039990 dated Sep. 5, 2016, 11 pages.

(Continued)

*Primary Examiner* — Cheng-Feng Huang
(74) *Attorney, Agent, or Firm* — Amin, Turocy & Watson, LLP (57) ABSTRACT

The technology described herein is directed towards content rights data that are associated with content (a data item) to make that content selectively available or unavailable in responses by a data service to client requests. A client includes client content rights data in association with each request, (e.g., via a token), and the data service uses that client content rights data as query parameters (constraint criteria) in making a request for a data item. Client content rights data also may be used for accessing cached data. Availability constraints may include client location, brand, channel, device class and time (commence and cease).

20 Claims, 10 Drawing Sheets

Related U.S. Application Data (60) Provisional application No. 62/187,137, filed on Jun. 30, 2015.

(51) Int. Cl.
*H04N 21/254* (2011.01)
*H04N 21/4627* (2011.01)
*H04N 21/266* (2011.01)
*H04N 21/442* (2011.01)

(52) U.S. Cl.
CPC ... *H04N 21/26613* (2013.01); *H04N 21/4627* (2013.01); *H04N 21/44204* (2013.01)

(56) References Cited

U.S. PATENT DOCUMENTS

| | | | |
|---|---|---|---|
| 2003/0165241 A1* | 9/2003 | Fransdonk | G06Q 20/3823 380/258 |
| 2003/0167392 A1* | 9/2003 | Fransdonk | H04L 63/0876 713/156 |
| 2004/0158709 A1 | 8/2004 | Narin et al. | |
| 2004/0158731 A1 | 8/2004 | Narin et al. | |
| 2005/0021987 A1 | 1/2005 | Cahill et al. | |
| 2007/0206799 A1* | 9/2007 | Wingert | H04L 9/0822 380/285 |
| 2007/0283046 A1 | 12/2007 | Dietrich et al. | |
| 2009/0282432 A1 | 11/2009 | Hahnefeld et al. | |
| 2010/0217974 A1 | 8/2010 | Fujimoto et al. | |
| 2011/0225417 A1 | 9/2011 | Maharajh et al. | |
| 2012/0158770 A1 | 6/2012 | Benadjaoud et al. | |
| 2012/0166799 A1 | 6/2012 | Shamsaasef et al. | |
| 2012/0221853 A1 | 8/2012 | Wingert et al. | |
| 2012/0311633 A1 | 12/2012 | Mandrekar | |
| 2014/0006951 A1* | 1/2014 | Hunter | H04N 21/431 715/719 |
| 2014/0101722 A1 | 4/2014 | Moore | |
| 2015/0074721 A1 | 3/2015 | Fishman et al. | |
| 2015/0254344 A1* | 9/2015 | Kulkarni | G06F 16/951 707/747 |
| 2015/0278774 A1 | 10/2015 | Barrows et al. | |

OTHER PUBLICATIONS

Final Office Action received for U.S. Appl. No. 15/194,969 dated Apr. 30, 2019, 36 pages.
Non-Final Office Action received for U.S. Appl. No. 15/194,969 dated Dec. 14, 2018, 34 pages.
Final Office Action received for U.S. Appl. No. 15/194,969 dated Jul. 20, 2018, 30 pages.
Non-Final Office Action received for U.S. Appl. No. 15/194,969 dated Feb. 12, 2018, 21 pages.
Colombian Office Action for Colombian Patent Application Serial No. NC2017/0013333 dated Apr. 9, 2019, 17 pages.
European Office Action for European Patent Application Serial No. 16 741 185.9-1209 dated May 28, 2019, 8 pages.
Notice of Allowance received for U.S. Appl. No. 15/194,969 dated Nov. 29, 2019, 24 pages.
Chinese Office Action for Chinese Patent Application Serial No. 201690000982.7 dated Jul. 3, 2018, 4 pages.
Colombian Office Action for Colombian Patent Application Serial No. NC2017/0013333 dated Jan. 31, 2018, 3 pages.
European Office Action for European Patent Application Serial No. 16 741 185.9-1209 dated Apr. 2, 2020, 8 pages.
Mexican office Action for Mexican Patent Application serial No. MX/a/2017/016542 dated Aug. 6, 2020, 5 pages.
Argentinian Office Action for Argentinian Patent Application serial No. 20160101979 dated Sep. 8, 2020, 5 pages.

* cited by examiner

CONTENT RIGHTS HEADERS

CROSS-REFERENCE TO RELATED APPLICATIONS

This application is a continuation of co-pending U.S. patent application Ser. No. 15/194,969, filed Jun. 28, 2016, entitled "CONTENT RIGHTS HEADERS, which claims priority to U.S. Provisional Patent Application No. 62/187,137, filed Jun. 30, 2015, entitled "CONTENT RIGHTS HEADERS." The entireties of the aforementioned applications are hereby incorporated by reference herein.

BACKGROUND

Digital content providers (e.g., streaming video network content providers) need to control the availability of their content. This control is often more than preventing access to non-subscribers, and for example may need to deal with the availability of content (or not) among client subscribers. For example, a large number of television programs may be present on a server (e.g., of a datacenter/content delivery network) that serves South American clients, however viewers in Argentina may not have access to the same television programs that viewers in Columbia can access. There is thus a locale-based consideration with respect to program availability. In addition to locale, there are typically other factors for deciding whether a given client has access to a given piece of content.

Regardless of whether the programs themselves can be blocked from certain viewers, it is generally not desirable to send a client a menu, list or the like of programs that the client cannot view, because this frustrates clients. Using the above example, a client in Argentina should not see a menu of items (e.g., television shows/movies) that includes those items available for viewing only in Columbia, and vice-versa.

However, because many of the programs do overlap with respect to their availability for viewing among potential clients, it is inefficient for the data items that reference such overlapping pieces of content to be replicated for each client/type of client. For example, for efficiency it may be desirable to have only a single South American datacenter for content available in South America, even though each piece of content in that datacenter is not available to each South American client.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards maintaining content rights data in association with a data item. Upon receiving a client request for the data item, in which the request is from an authorized client and includes client content rights data, described herein is determining whether the content rights data maintained in association with the data item indicates that the data item is available to the authorized client. If so, the data item is returned; if not, an indication of unavailability of the data item is returned.

By way of example, consider that for contractual reasons, a program X is available to viewers in Brazil but not to viewers in Chile. By associating content rights headers with the program X, attempts to obtain a data item to display program X as available to those Brazilian clients entitled to X are allowed to return the data item. The same request, except made by a Chilean client, results in an error being returned.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards associating content rights filtering data with data items (content/references to content) so that only certain of the data items are returned to appropriate users. Non-limiting examples of such content rights filtering data (criteria) may include "Territory," "Brand," "Channel," "Agent," "Commences" and "Ceases." Examples of each of these filtering data are set forth below.

In one or more implementations, the filtering data are referred to as content rights, and may be specified in a "header" associated with a message body sent by a "writer" to a data service, in which the writer is typically an entity associated with the enterprise that owns the content. Notwithstanding, the term "header" as used herein is understood to broadly apply to any association/relationship between rights and content, whether an actual message header, a footer, a reference to the content rights in another location (e.g., a data store) and so on.

The data service maintains the content rights in association with each data item, as a lightweight mechanism for control of availability. Any client request for a data item associated with content rights is subject to meeting the criteria set forth in those rights. The content rights thus control which clients can receive which data items, and/or any content corresponding to those data items.

It should be understood that any of the examples herein are non-limiting. For instance, some of the examples refer to data items (e.g., graph nodes, tiles or icons) related to client selection of video content (including audio) from a streaming service that delivers streaming content comprising movies, television shows, documentaries and the like. However, the technology described herein is independent of any particular type of data items and/or to the content referenced thereby; indeed the technology may be applied to the content directly, rather than the data items used to obtain content, such as for playback. Thus, any of the embodiments, aspects, concepts, structures, functionalities or examples described herein are non-limiting, and the technology may be used in various ways that provide benefits and advantages in data communication and content rights in general.

Figure 1:
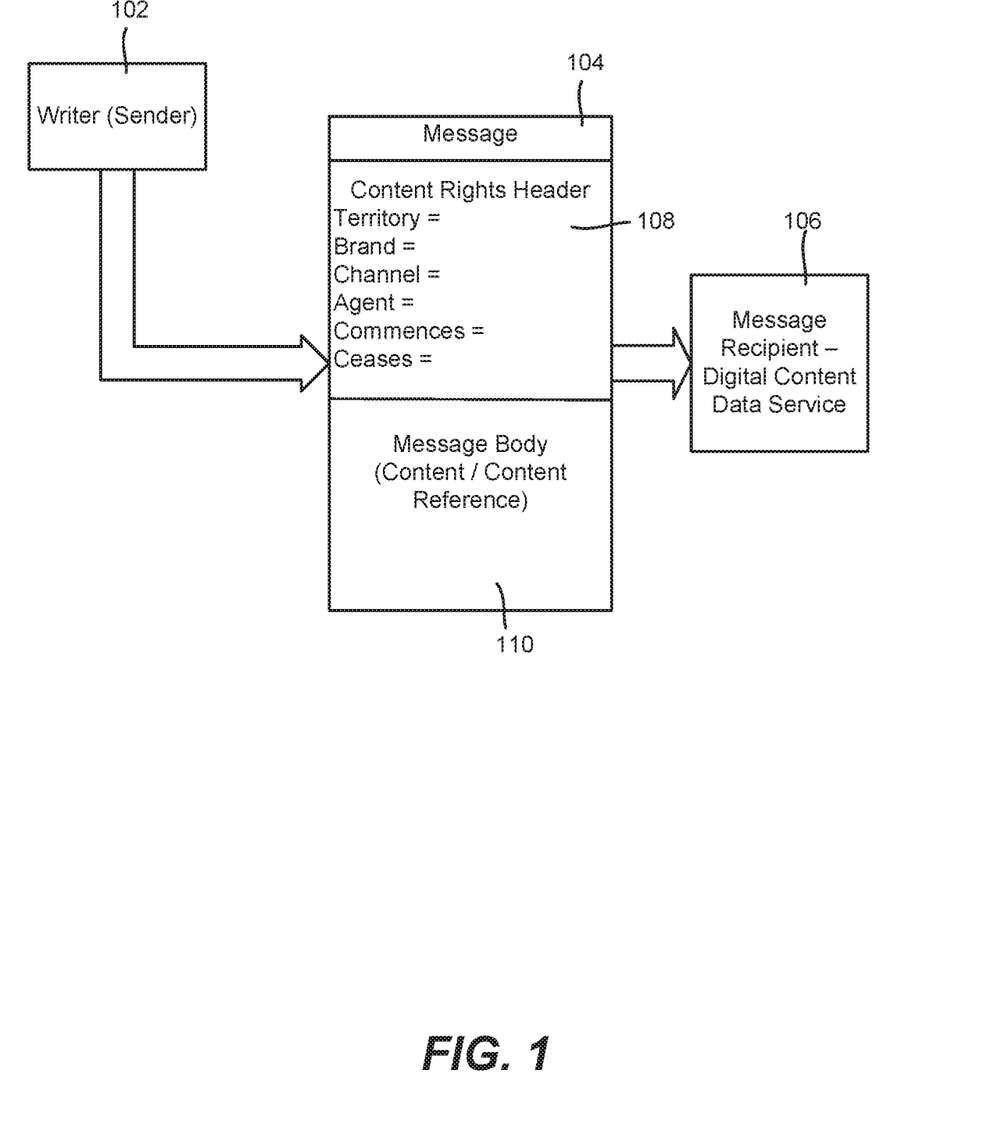
FIG. 1 is an example block diagram representation of associating content rights with a message, via a content rights header, for storing in conjunction with content, according to one or more example implementations.

FIG. 1 exemplifies a general concept of a writer (sender) 102 sending a message 104 to a message recipient (e.g., data service) 106. The message includes content rights data, e.g., in a message header 108, along with a message body 110. For example, the message body may 110 include an identifier (ID) of a data structure (e.g., a graph node) that represents a movie available from the data service. The node, in turn, may include the title, an image URL, a rating, a plot description and so forth along with a reference to the actual streaming content for playback.

Thus, via the example concepts of FIG. 1, a writer may associate certain content rights with a piece of content, whether directly to the content or indirectly via a data structure that allows playback of that content. As will be understood, for example, if a client requests a menu of "Movies A-Z," the client will only receive a set of movies (e.g., represented by a set of tiles) that match the client's content rights/entitlements with respect to each movie's associated content rights. Other data, such as the date and time of the client request may be a factor as to whether a client receives a tile representing a movie or not.

An example of how a writer sender may send messages is shown in FIG. 1, which includes a content rights header (e.g., within a message header). In FIG. 1, any or all of the constraints may be specified. If not specified, default constraints may be used, whether by storing any needed default contents rights data in association with storing the body, and/or by applying default data as needed at the time of responding to a request. As is seen, the content rights data (headers) limit content availability as specified by the writer.

Figure 2:
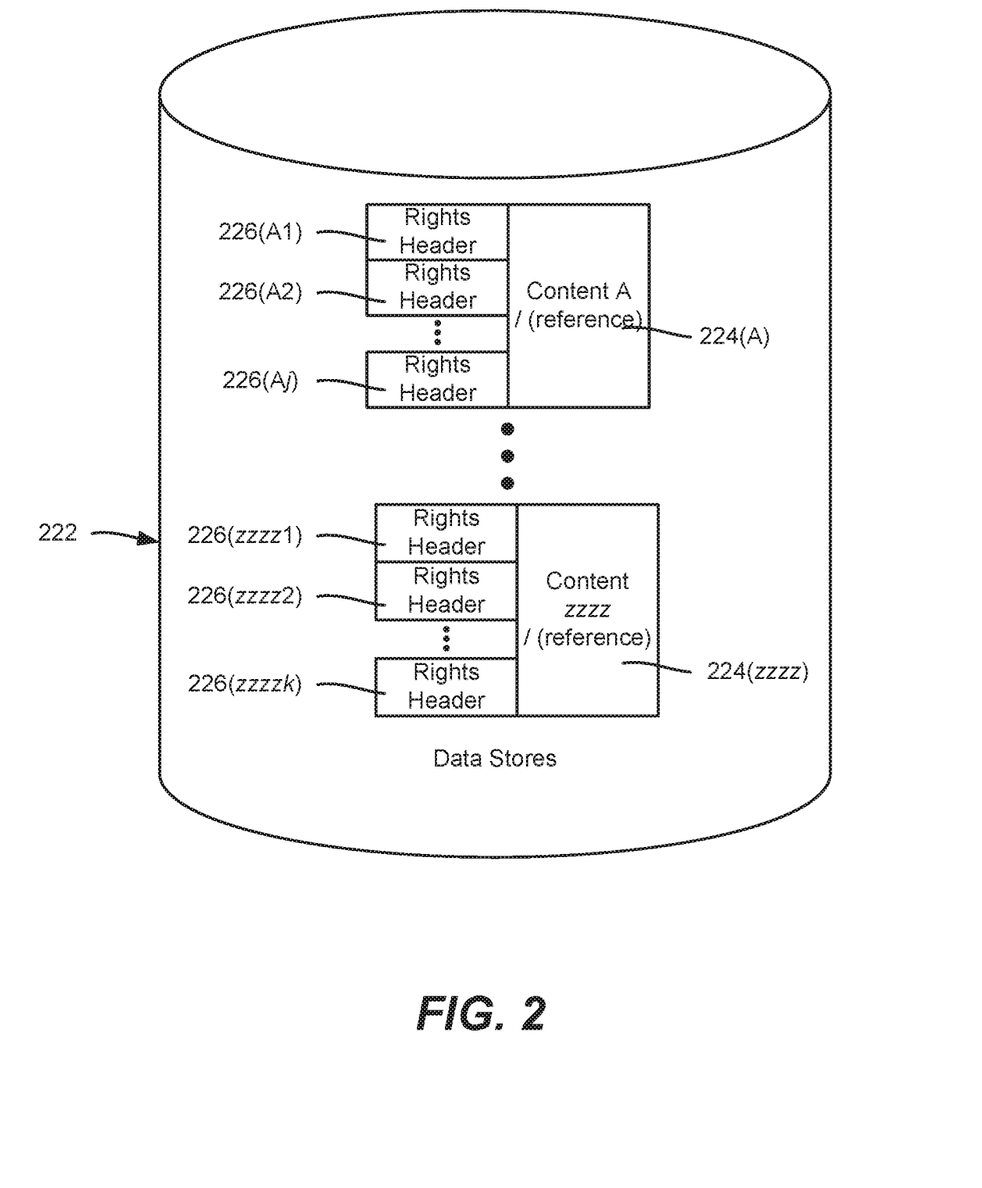
FIG. 2 is an example representation of content pieces each having various content rights headers, according to one or more example implementations.

FIG. 2 shows an example of one or more data stores 222 (e.g., coupled to a data service) in which any set of content or reference to content, e.g., content 224(A)-content 224 (zzzz) may be associated with one or more content rights headers, e.g., 226(A1)-226(Aj) and 226(zzzz1)-226(zzzzk), respectively. The data store(s) 222 may include a database that returns data when a query based upon a data item identifier and client content rights locate a match with content having associated content rights data.

As can be seen, the same content/data item need not be replicated to have different access rights. For example, a database query for a data item may allow the data item to be returned for two different types of clients (based upon client "agent" content rights data, described below), but not another type of client.

Figure 3:
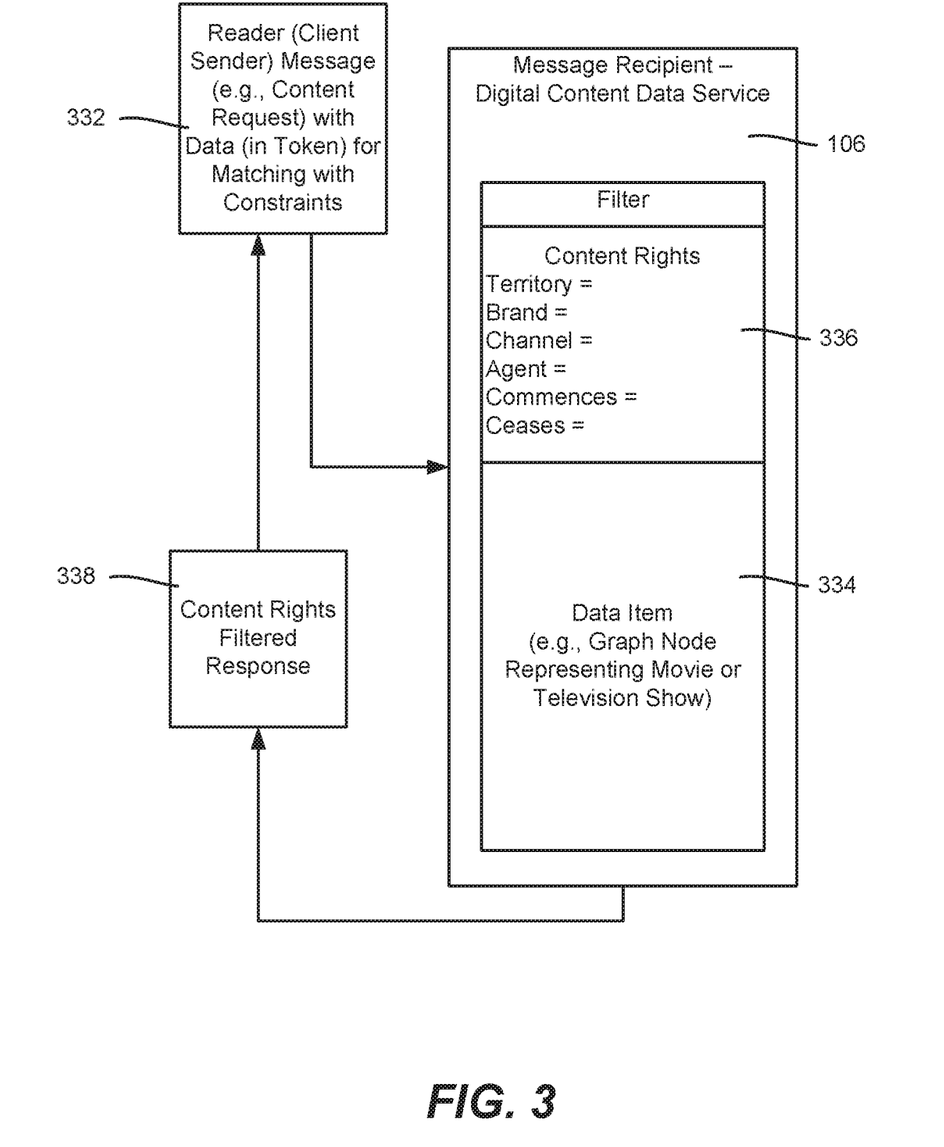
FIG. 3 is an example representation of a client request for a content data item being conceptually filtered based on the content rights headers, according to one or more example implementations.

FIG. 3 exemplifies the general concept of filtering a client request for data as received at a data service 106. For example, a reader (client sender) sends a message 332 requesting a data item 334, in which the message includes data (such as in an accompanying token) representing what the client is entitled to receive. The requested data item is filtered according to its associated content rights 336, resulting in a content rights filtered response 338. The response 338 comprises a message that contains the requested data item if the content rights are met, or an error (e.g., "content unavailable" if not.

Thus, a conceptual example of how a reader sender may send a message requesting a data item is shown in FIG. 3. As is seen, the content rights headers limit content availability, by filtering in accordance with the constraints set by the writer on that data item.

In one or more implementations, constraints may be inclusive or exclusive where appropriate, and may be combined. Thus, for example, a constraint may specify "U.S. domestic" to allow U.S. only viewers to view certain items, while another constraint may specify "AND NOT Argentina" to allow South America viewers access to a data item except for those in Argentina.

Note that in one or more implementations, a client may request a set of data items in a batch request. Filtering may reduce the number of actual items a client receives. Thus, for example, a client may request ten data items such as to render a visible representation of them in a UI, and receive eight responses containing data items and two responses containing errors. As can be readily appreciated, the client device does not receive the two data items, and thus they are not rendered, whereby the client user cannot select them. The client has no way to request playback of the content, because there is no interactive element from which to select playback. Moreover, the client user may have no idea these items are available to other users.

Thus, there is a mechanism/scheme to express certain availability parameters during the origination and distribution of content. One such mechanism satisfies constraints based upon digital rights, including, but not limited to Territory, Brand, Channel, Agent, Commences and Ceases data.

The following sets forth and exemplifies example constraints that may be applied via content rights data:

---

Territory—constraints upon geographic availability. An example of territory rights includes locates such as U.S domestic, Latin America Columbia, Latin America Argentina, European Union Nordic, and so forth. Virtually any territory constraints may be defined specified.
Brand—Constraints upon brand availability, such as HBO ®, Cinemax ® and so on.
Channel—Constraints upon delivery channel availability, including subscription, free for distribution, tiered availability of content such as packages (e.g., HBO ® and Cinemax ® together), electronic sell through (e.g., an online store), and so through.
Agent—refers to constraints upon requestor availability, such as device type or class, groups of platforms and so on. For example, a data item may be limited to certain devices or classes of devices, e.g., "ten-foot" types (large displays), limited ten-foot types (large displays with limited computing power), three foot types (monitors, tablets, laptops) and one-foot (e.g., smartphones).

Commences and Ceases are constraints upon temporal availability, e.g., starts 12:00 am on Jun. 1, 2016 and ends 11:59 pm on Jul. 31, 2016.

Described herein is expressing the above constraints in a form (e.g., a standard form) that allows the constraints to be used to express content availability at its origination, that is, via a writer. The constraints may also be used to ask only for content that satisfies certain constraints.

To summarize, to express the constraints, when passing messages to one or more of a digital content service's systems, a sender passes one or more of the following, named constraints: Territory—a name among a set of defined names that expresses geographic constraints on content availability; Brand—a name among a set of defined names that expresses brand constraints on content availability; Channel—a name among a set of defined names that expresses delivery channel constraints on content availability; Agent—a name (or code) among a set of defined names that expresses requestor identity (e.g., device class) constraints on content availability; Commences—a date and time at which the constraints become active; Ceases—a date and time at which the constraints become inactive.

The sender may be a reader or a writer. When acting as a writer, the sender is placing a constraint on content availability. When acting as a reader, the sender is asking the receiver to filter results, based upon the pre-written constraints. For example, the reader sender message may specify the territory, which needs to match the writer's previously specified territory restraint to receive the requested content.

Figure 4:
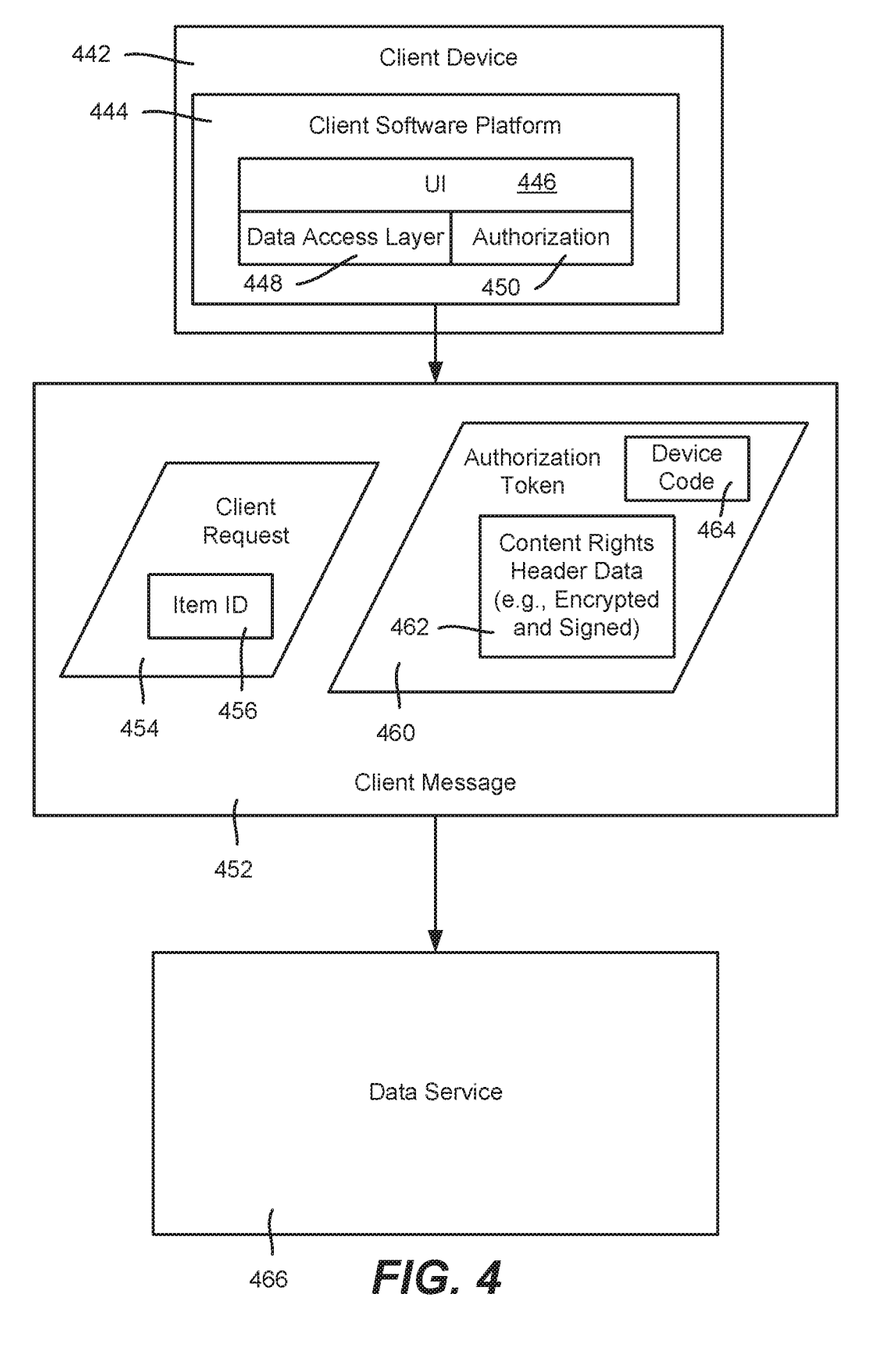
FIG. 4 is an example of a client request for data item content that includes content rights header data (e.g., in a token) for filtering purposes, according to one or more example implementations.

FIG. 4 is an example of a client device 442 making a request to a data service 466. The exemplified client device 442 includes a client software platform 444 containing a user interface (UI) 446, a data access layer 448 and authorization logic 450. In general, the UI 446 requests or causes a request for a data item, e.g., a menu may request tiles representing television shows. The data access layer 448 formats the request into a message 452 to the data service 466.

During authentication, the client authorization logic 450 assembles a token 460 that represents/identifies/authorizes the client for further messages. Note that the client is thus authorized to receive requested data items from the data service, subject to also meeting content rights constraints. In one or more implementations, art of the token 460 includes the digital rights header data 462, e.g., encrypted and signed so as to not allow a malicious client to obtain more than entitled. The token also may include a device code 464, although this may be included to an extent in the digital rights header data 462, e.g., in the "Agent" field.

The exemplified message 452 of FIG. 4 includes a request 454 that includes the data item ID 456 for the requested data item. Whether the data service returns the requested data item depends on the client's message token 460, including the content rights header data 462.

Figure 5:
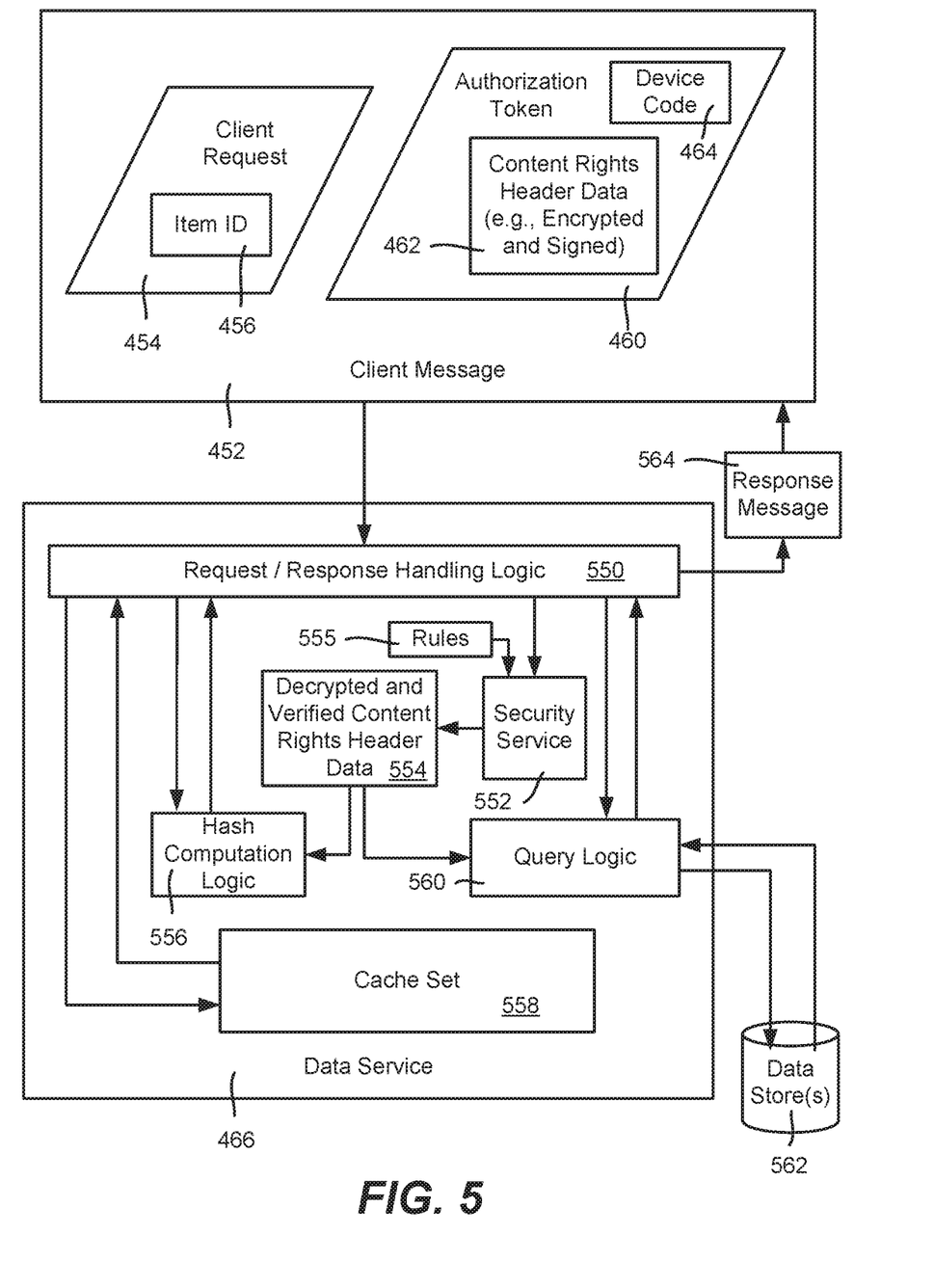
FIG. 5 is an example of the client request (e.g., the request of FIG. 4) being handled by a data service, including filtering requests via content rights header data, according to one or more example implementations.

FIG. 5 exemplifies how the client message 452 is handled by one implementation of a data service 466. In general, response handling logic 550 (e.g., of a load-balanced server of the data service 466) receives the message 452 and provides the message to a security service 552, which decrypts and verifies the token, including to obtain the content rights header data 554 in a useable (decrypted) form.

Note that the security service 552 may make exceptions, e.g., based upon rules 555 or the like. For example, consider that a U.S. client connects to the data service 466 while in Mexico. Even though the actual locale (e.g., based upon IP address) indicates Mexico, the client may receive data items from the U.S. catalog, as if he or she was in the U.S. In contrast, because of contractual obligations or the like, a user from Columbia while in Mexico may instead get the Mexico catalog items. Thus, rules 555 at the data service 466 may override information in the token or elsewhere, (e.g., a rule may state that the IP address location in Mexico may override the token's territory for a user from Columbia but not one from the U.S. with respect to data item availability).

One place that the requested data item may be maintained is within a cache set 558 (one or more key, value cache stores) of the data service 466. To this end, a key is computed based upon a hash of the data item identifier in conjunction with (at least part of) the content rights header data. Thus, for example, a client with U.S. domestic territory data may have a different key with respect to a client with E.U. territory data. A cache hit or miss thus may be dependent on the client's content rights data. Note that a cache entry contains expiration data, so that a request outside of the commences/ceases availability time window is not satisfied from the cache.

If found valid in the cache set 558, the logic 550 returns the data item in a response 564 to the request. Otherwise, the response handling logic 550 looks to an underlying data store (or stores) 562 for the data item. To this end, query logic 560 uses the content rights data 554 to query for the data item with the appropriate constraints; other data such as the time of the request may be provided for use in filtering against the commences/ceases availability time window. If the query constraints are matched at the data store 562 and the data item returned, the data item is returned in the response message 564, otherwise an error is returned.

Figure 6:
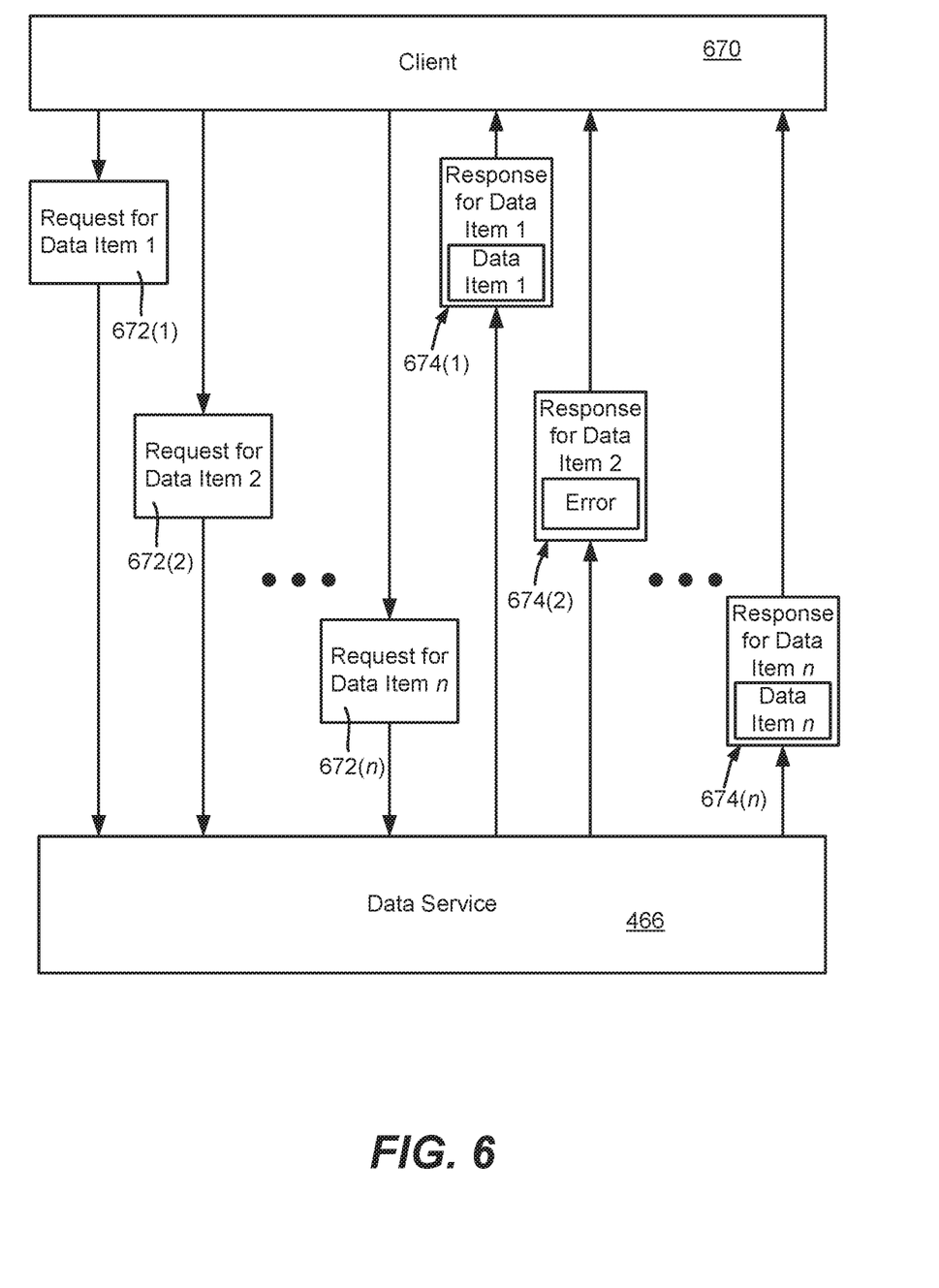
FIG. 6 is an example representation of client requests being filtered via content rights header data for returning responses, according to one or more example implementations.

FIG. 6 shows a general concept of filtering in this way. In FIG. 6, each client 670 request 672(1)-672(n) receives a response 674(1)-674(n). The depicted requests 672(1)-672(n) may be separate requests, in batch requests, or in a combination of individual and batch requests.

As can be seen, the data service 466 filters out zero or more of the requests based upon the token (content rights data) and other criteria such as time of the request by returning an error for any data item whose constraints are not met; e.g., the request 672(2) for data item 2, in FIG. 6 returns error in the response 674(2). The client 670 knows by the error that no data item is available for certain requests, and thus in one or more implementations, the client user never sees such items and cannot request their content be played. Note that it is feasible to return data items that are not available along with an indication of unavailability, e.g., return unavailable data items in an inactive form so that, for example, a user interface can render an inactive (e.g., grayed-out) form of the data item. This may be useful for promotional purposes or the like, e.g., to show something coming soon but not yet available for playback, show inactive HBO® titles when only Cinemax® titles are actually available, and so on.

Figure 7:
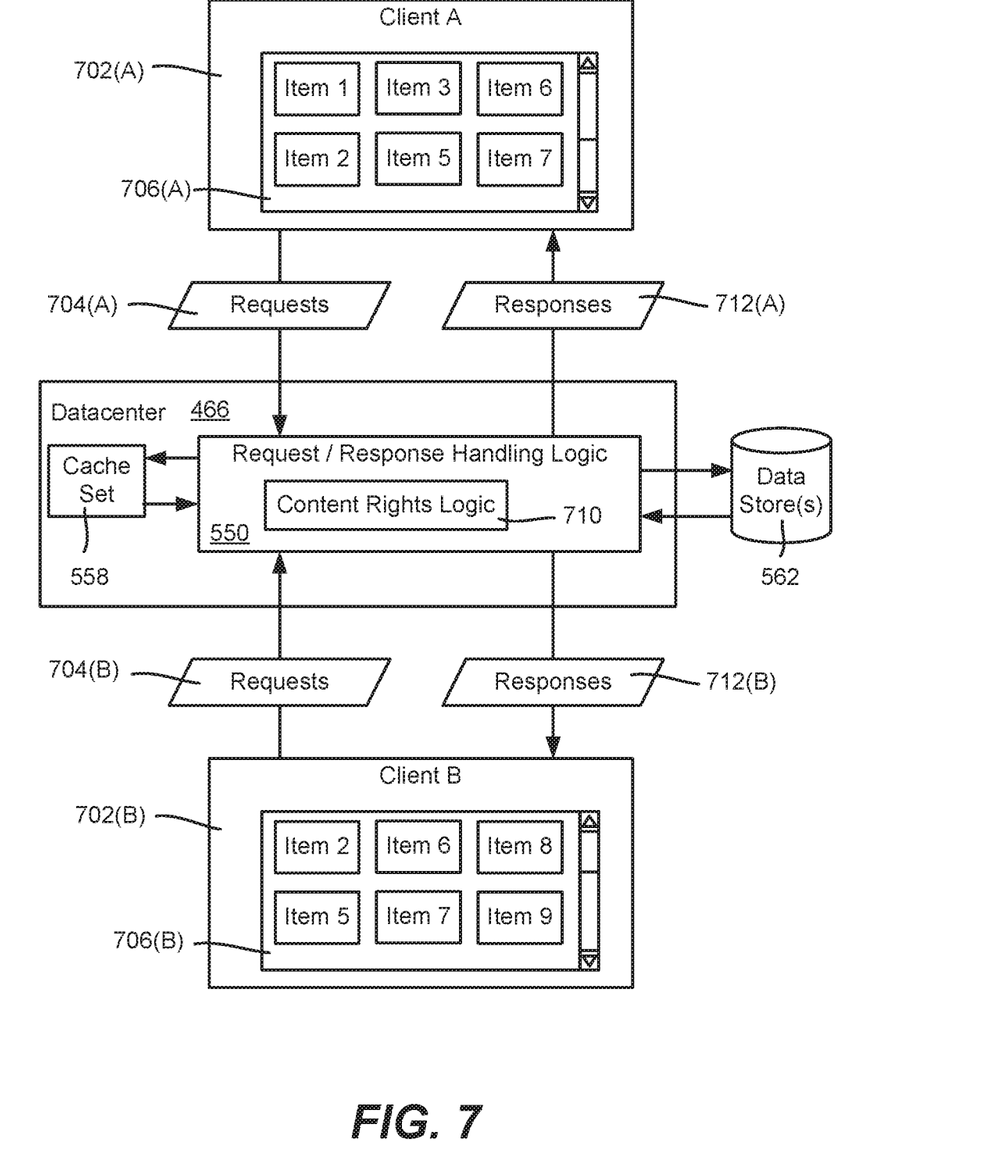
FIG. 7 is an example representation of client requests for the same data items being filtered via content rights header data into different result sets, according to one or more example implementations.

FIG. 7 is an example block diagram representation of two clients 702(A) and 702(B) making requests 704(A) and 704(B), respectively to a datacenter 466, e.g., including requests for the same data items 1-9, such as to fill respective user interfaces 706(A) and 706(B) with tiles representing available streaming video content.

As described herein, the request/response handling logic 550 includes content rights logic 710 that basically filters out requests that are not available to a given client, e.g., based upon per-client information including in the authorization token. This is performed both for items that may be cached in the cache set 558 and/or for items obtained from a query or set of queries formulated to the data store(s) 562.

In the example of FIG. 7, it is seen that client A 702(A) receives data item 1, data item 2, data item 3, data item 5, data item 6 and data item 7. In contrast, client B 702(B) receives data item 2, data item 5, data item 6, data item 7, data item 8 and data item 9. Thus, because of different content rights headers associated with the data items, and the per-client information in each client token, the data items that each client 702(A) or 702(B) receives are different. Note that this may be because of different client entitlements based upon territory, brand, channel and/or agent in the token, and/or possibly because of different times (dates) of the requests and the like, as well as possibly other factors such as the IP address from which the request is being made.

Figure 8:
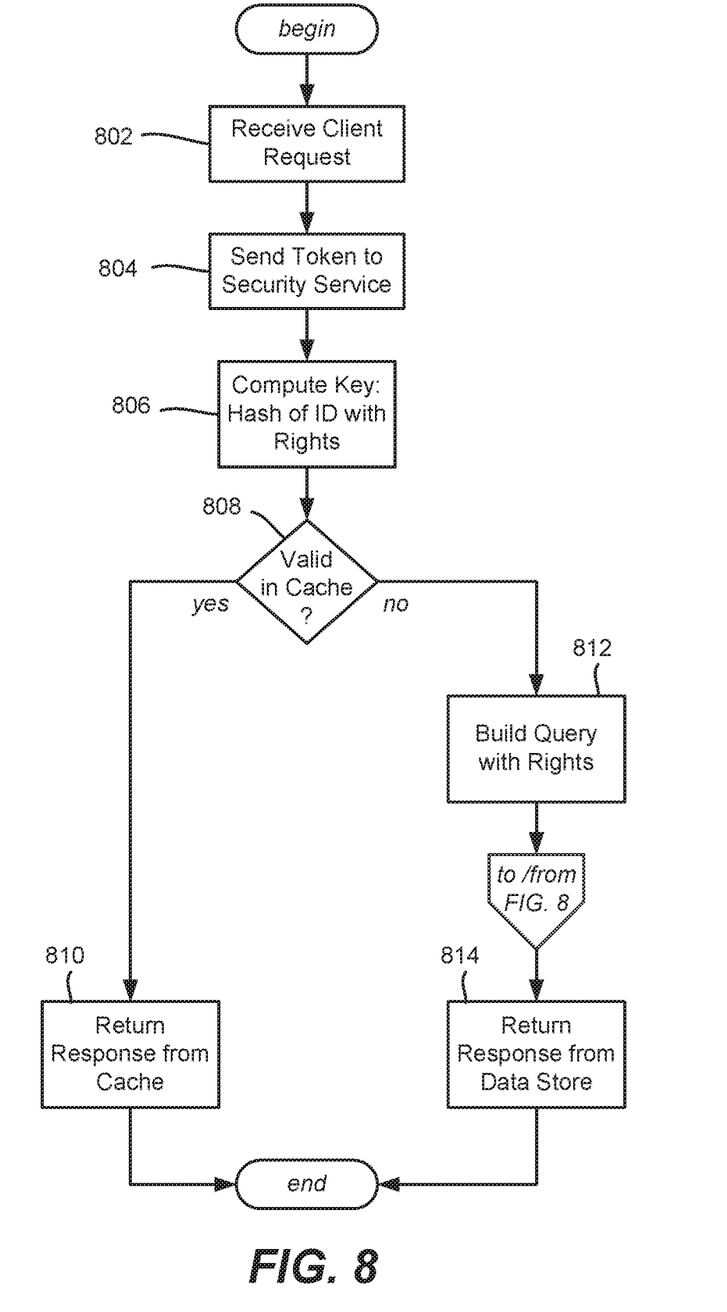
FIGS. 8 and 9 comprise a flow diagram showing example steps that may be taken by a data service to use content rights headers in returning a response to a client request, according to one or more example implementations.
Figure 9:
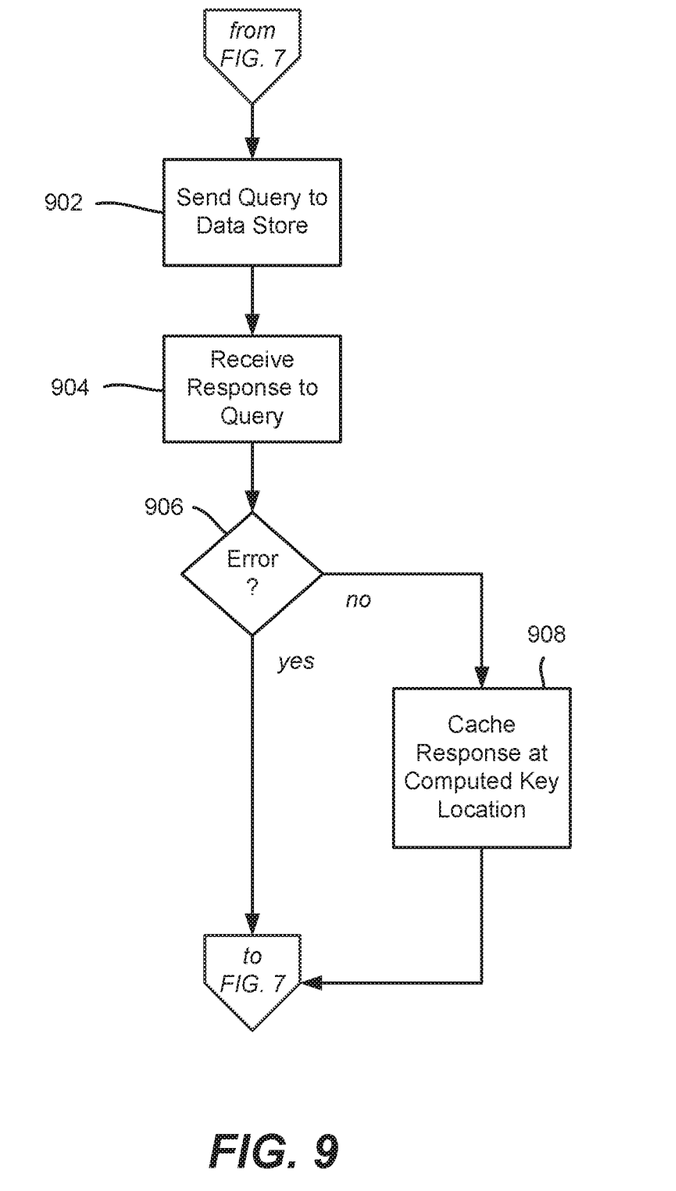

FIGS. 8 and 9 comprise a flow diagram showing how a data service may respond to a request for a data item, beginning at step 802 where the client request is received. Step 804 sends the accompanying token to the security service, e.g., to decrypt the encrypted content rights data into useable data. As set forth above, the security service also may override some of this data based upon rules or the like.

Step 806 represents computing the hash key based upon a combination of the data item identifier and at least part of the client content rights obtained from the token (and/or any rules). If valid in the cache at that key (step 808), step 810 responds using data from the cache. Note that the time of the request may make the cache entry invalid if still present in the cache after expiration.

If not cached or not valid (e.g., expired), step 812 represents formulating a query for the data item that includes at least part of the content rights data as one or more query parameters, e.g., something like "return data item X where territory=Y, brand=Z" and so on. The example process continues to FIG. 9.

Step 902 of FIG. 9 represents submitting the query to the data store (e.g., database), with step 904 representing receiving the query response. If an error is returned as evaluated at step 906, then the data is not available to this client. Otherwise the data item is available, and is cached for responding to future requests by other similar clients (or again by the same client) at step 908, using the computed key (step 806).

The process returns to FIG. 8 step 814, where the response to the client, which may contain the data item or an error message, is returned.

As can be seen, there is provided a way to limit availability of content to requesting clients based upon content rights corresponding to each client and associated with each data item/content. Associating rights with the data item/content provides a lightweight mechanism for controlling availability at any point of access, e.g., for cached items as well as stored data items in a catalog data store, for example.

One or more aspects are directed towards maintaining content rights data in association with a data item, and receiving a client request for the data item, in which the request is from an authorized client and includes client content rights data. Described herein is determining whether the content rights data maintained in association with the data item indicates that the data item is available to the authorized client, and if so, returning the data item, and if not, returning an indication of unavailability of the data item.

Determining whether the content rights data maintained in association with the data item indicates that the data item is available to the authorized client may include computing a hash key based upon an identifier of the data item and at least part of the client content rights data, and using the hash key to look for a cache entry. Determining whether the content rights data maintained in association with the data item indicates that the data item is available to the authorized client may include formulating a query for the data item in which one or more query parameters correspond to at least part of the client content rights data. Determining whether the content rights data maintained in association with the data item indicates that the data item is available to the authorized client may include evaluating time information in the content rights data with respect to a time of the request; (time information/time of the request may include both date and time data).

Receiving the client request for the data item that includes the client content rights data may include receiving a request and accompanying token. Determining whether the content rights data maintained in association with the data item indicates that the data item is available to the authorized client may include processing the token to obtain the content rights data therefrom.

Returning the indication of unavailability of the data item may include returning an error. Returning the indication of unavailability of the data item may include returning the data item and an indication that the data item is inactive.

Maintaining the content rights data in association with the data item may include receiving a message from a writer containing the content rights data in a message header and the data item content in a message body. Maintaining the content rights data in association with the data item may include receiving a message from a writer containing the content rights data in a message header and a reference to the data item content in a message body.

One or more aspects are directed towards request handling logic that receives a client request for a data item from an authorized client, the request including a data item identifier and associated with a token having client content rights data therein. Hash computation logic computes a hash key based upon the data item identifier and at least part of the content rights data. Request handling logic uses the hash key to look for the data item in a cache, and if found, returns the data item in a response to the client request, and if not found, to query for the data item in a data store using at least part of the client content rights data as one or more query parameters. If the data item is returned from the data store in response to the query, the request handling logic returns the data item in a response to the client request, and if not found, returns an indication that the data item is unavailable in a response to the client request.

If the data item is returned from the data store in response to the query, the request handling logic may cache the data item in at least one cache based upon the hash key.

The client content rights data may include at least one of: a territory constraint, brand constraint, channel constraint, agent constraint, commences constraint and/or ceases constraint.

One or more aspects are directed towards receiving a client request for a data item, obtaining client content rights data from a token associated with the client request, and using the client content rights data to determine whether the data item is available to the client. If available, described herein is returning the data item to the client in a response to the request; if not available, described herein is returning an indication to the client that the data item is not available to the client. When the data item is not available to the client, returning an indication to the client that the data item is not available to the client may include returning an error message.

Using the client content rights data to determine whether the data item is available to the client may include looking for a cached copy of the data item based at least in part on at least part of the client content rights data. Looking for the cached copy of the data item based at least in part on at least part of the client content rights data may include computing a hash value as a cache key, in which the hash value is based upon an identifier of the data item included in the client request and at least part of the content rights.

Using the client content rights data to determine whether the data item is available to the client may include formulating a query for the data item including using at least part of the client content rights data as one or more query parameters. When the data item is received in response to the query, the data item may be cached.

Also described herein is modifying the client content rights data based upon a rule set comprising one or more rules.

Example Computing Device

The techniques described herein can be applied to any device or set of devices capable of running programs and processes. It can be understood, therefore, that handheld, portable and other computing devices and computing objects of all kinds including cell phones, tablet/slate computers, gaming/entertainment consoles and the like are contemplated for use in connection with the various embodiments. Accordingly, the below general purpose remote computer described below in FIG. 10 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
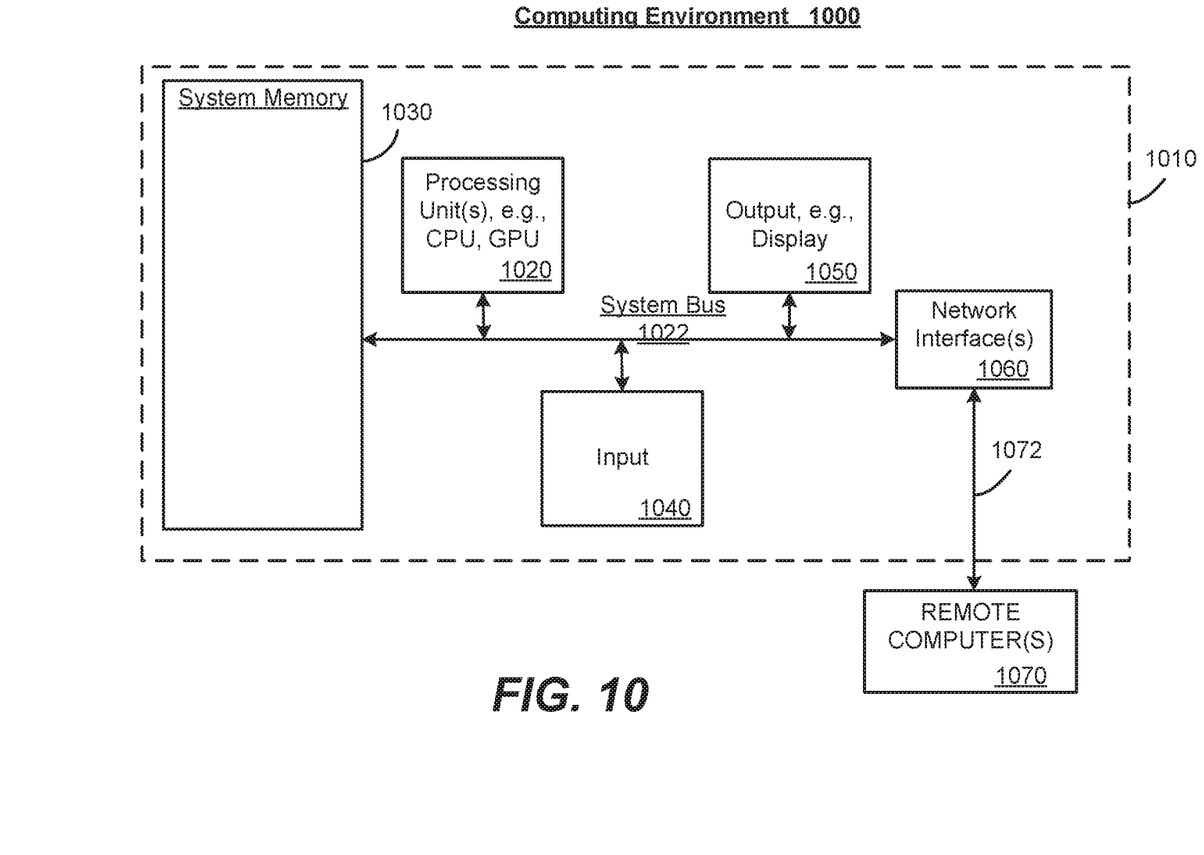
FIG. 10 is a block diagram representing an example computing environment into which aspects of the subject matter described herein may be incorporated.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. In addition, the computing system environment 1000 is not intended to be interpreted as having any dependency relating to any one or combination of components illustrated in the example computing system environment 1000.

With reference to FIG. 10, an example device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of machine/computer-readable media and can be any available media that can be accessed by computer 1010. The system memory 1030 may include computer storage media in the form of volatile and/or nonvolatile memory such as read only memory (ROM) and/or random access memory (RAM), and hard drive media, optical storage media, flash media, and so forth. By way of example, and not limitation, system memory 1030 may also include an operating system, application programs, other program modules, and program data.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such as a local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A system comprising,
a hardware processor; and
a memory communicatively coupled to the hardware processor, the memory having stored therein computer-executable instructions, which when executed perform operations, the operations comprising:
caching data items at respective cache locations in a cache data structure, wherein each cache location of the respective cache locations has a cache key that is formed using a hash computation that is based on an identifier of a data item in the cache location and content rights data associated with the data item in the cache location;
receiving a request for a first data item, in which the request comprises a first identifier of the first data item and first content rights data associated with the first data item;
determining a hash key using the hash computation based on the first identifier and the first content rights data;
determining whether the first data item is in the cache data structure based on comparing the hash key to the cache keys of the respective cache locations; and
in response to determining that the first data item is found at a cache location having a cache key matching the hash key, returning the first data item from the cache location in a response to the request.

2. The system of claim 1, wherein the determining whether the first data item is in the cache data structure further comprises evaluating time information associated with the first content rights data with respect to a time of the request.

3. The system of claim 1, wherein the request comprises an authorization token.

4. The system of claim 1, wherein the request comprises a message, and wherein the first content rights data is received in an authorization token associated with the message.

5. The system of claim 1, wherein the caching data items comprises obtaining the data items from at least one data store.

6. The system of claim 1, wherein the content rights data comprises a territory constraint.

7. The system of claim 1, wherein the content rights data comprises a brand constraint.

8. The system of claim 1, wherein the content rights data comprises a channel constraint.

9. The system of claim 1, wherein the request is associated with device information associated with a client device making the request, and wherein the content rights data comprises an agent constraint.

10. The system of claim 1, wherein the content rights data comprises a commences constraint.

11. The system of claim 1, wherein the content rights data comprises a ceases constraint.

12. The system of claim 1, wherein the operations further comprise receiving the content rights data in a message header and receiving content of the data item and the identifier of the data item in a message body.

13. A method comprising,
maintaining, by a system comprising a processor, a cache, the maintaining comprising storing data items in the cache at respective cache locations, wherein each cache location of the respective cache locations has a cache key that is formed using a hash computation that is based on an identifier of a data item in the cache location and content rights data associated with the data item in the cache location;

receiving, a request for a first data item, in which the request comprising a first identifier of the first data item and first content rights data associated with the first data item; and computing a hash key using the hash computation based on the first identifier and first content rights data; and determining whether the first data item is in the cache data structure based on the hash key comparing to the cache keys of the respective cache locations; and in response to determining that the first data item is found at a cache location having a cache key matching the hash key, returning the first data item from the cache location in a response to the request.

14. The method of claim 13, wherein in response to determining that the first data item is not found in the cache, querying for the first data item in a data store using at least part of the first content rights data as one or more query parameters.

15. The method of claim 13, wherein the content rights data comprises at least one of: a territory constraint, a brand constraint, a channel constraint, or an agent constraint.

16. The method of claim 13, wherein the content rights data comprises at least one of: a commences constraint or ceases constraint.

17. A non-transitory machine-readable medium, comprising executable instructions that, when executed by a processor of a device, facilitate performance of operations, comprising:

caching data items at respective cache locations in a cache data structure, wherein each cache location of the respective cache locations has a cache key that is formed using a hash computation that is based on an identifier of a data item in the cache location and first content rights data associated with the data item in the cache location;

receiving a request for a first data item, in which the request comprises a first identifier of the first data item and first content rights data associated with the first data item;

determining a hash key using the hash computation based on the first data item identifier and first content rights data;

determining whether the first data item is in the cache data structure based on comparing the hash key to the cache keys of the respective cache locations; and in response to determining that the first data item is found at a cache location having a cache key matching the hash key, returning the first data item from the cache location in a response to the request.

18. The non-transitory machine-readable medium of claim 17, wherein the operations further comprise, in response to determining that the first data item is not found in the cache, querying for the data item in a data repository using at least part of the first content rights data.

19. The non-transitory machine-readable medium of claim 17, wherein the operations further comprise, in response to determining that the first data item is not found in the cache, returning an indication that the first data item is not available to the in response to the request.

20. The non-transitory machine-readable medium of claim 17, wherein the cache key comprises at least one of: territory data, brand data, channel data or agent data.

* * * * *